Feb. 3. 1925.
J. R. FLANNERY
LUBRICATING DEVICE
Filed Oct. 3, 1921
1,525,123
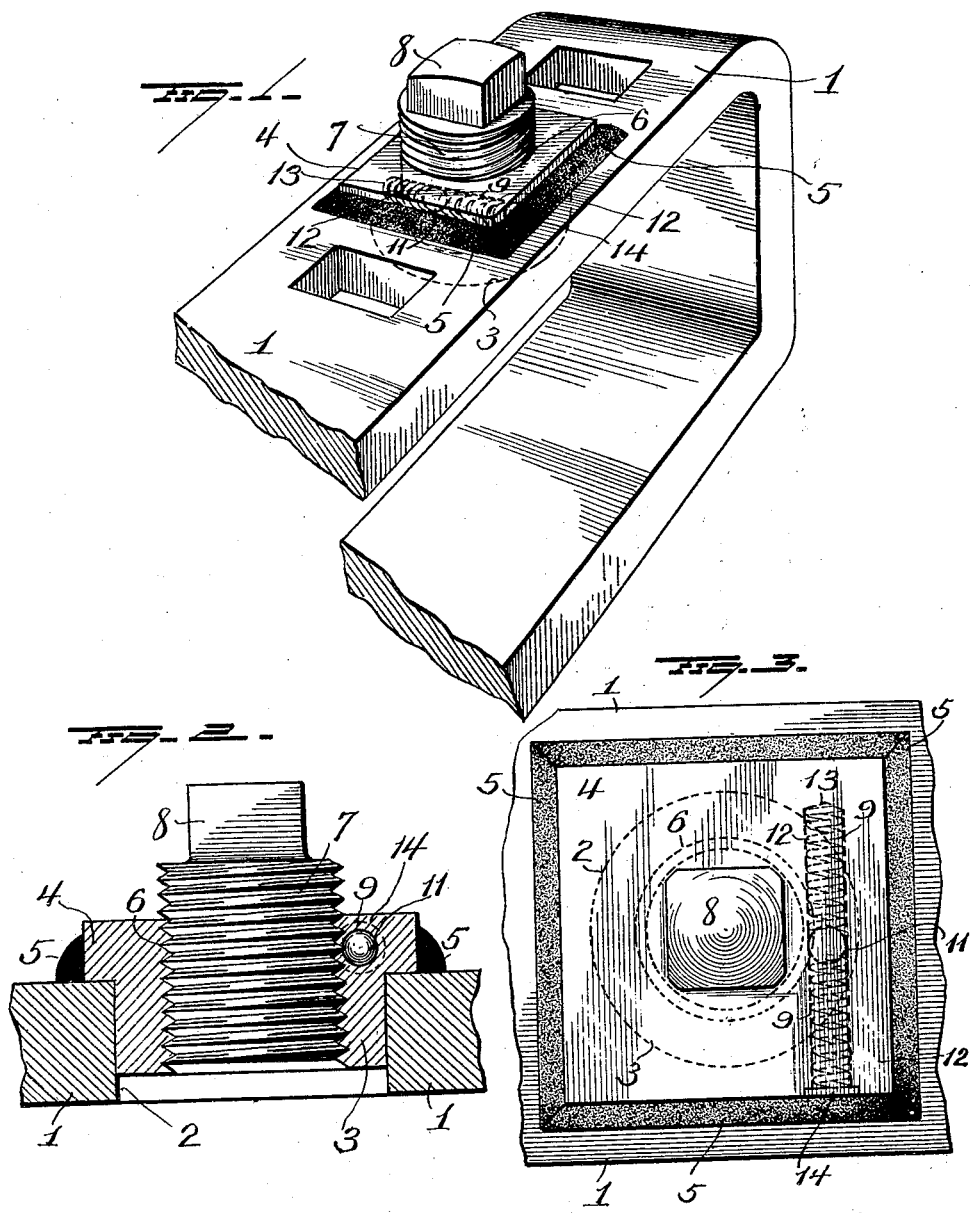

Patented Feb. 3, 1925.

1,525,123

UNITED STATES PATENT OFFICE.

JOHN ROGERS FLANNERY, OF PITTSBURGH, PENNSYLVANIA, ASSIGNOR TO FLANNERY BOLT COMPANY, OF PITTSBURGH, PENNSYLVANIA.

LUBRICATING DEVICE.

Application filed October 3, 1921. Serial No. 504,936.

*To all whom it may concern:*

Be it known that I, JOHN ROGERS FLANNERY, a citizen of the United States, and a resident of Pittsburgh, in the county of Allegheny and State of Pennsylvania, have invented certain new and useful Improvements in Lubricating Devices; and I do hereby declare the following to be a full, clear, and exact description of the invention, such as will enable others skilled in the art to which it appertains to make and use the same.

This invention relates to improvements in lubricating devices and more particularly to such as employ force feeding means for hard lubricant or greases,—one object of the invention being to provide simple, cheap and efficient means in a lubricator of the type specified, for effectually preventing the unscrewing of the threaded plug or plunger and at the same time permit of fine adjustment of the same to feed the grease without waste of the same.

A further object is to provide locking means for the threaded plug or plunger of a lubricating device, which shall be contained within the gland which forms the grease cup and so cooperate with the threads of the plug as normally to prevent retrograde movement of the latter and at the same time permit minute feeding adjustments of said plug or plunger.

With these and other objects in view, the invention consists in certain novel features of construction and combinations of parts as hereinafter set forth and pointed out in the claims.

In the accompanying drawings, Figure 1 is a perspective view of a portion of a connecting rod strap showing the application of my improvements thereto. Figure 2 is a sectional view, and Figure 3 is a plan view.

In Figure 1 of the drawing, I have shown my improvements as applied to strap 1 of a locomotive side connecting rod, having a hole 2 for a cup 3,—the latter constituting a grease cup. The cup 3 is provided with a flange 4 which overlies a portion of the strap 1 and may be welded thereto as indicated at 5, or in some instances the cup may be threaded into the hole in the strap and in that event, the welding of the gland to the strap might be omitted. The grease cup is threaded interiorly, as at 6 to receive an exteriorly threaded plug or plunger 7 and the latter may be provided with an angular head 8 to receive a wrench.

The grease cup is provided with an elongated bore or chamber 9 which is so located that it will be approximately tangential to the bore of said cup and so that its intermediate portion will intersect a thread or threads in the latter and cut through the same. Locking devices comprising an obstruction which may be in the form of a hard ball 11, and springs 12 at respective sides of said ball, are located within the bore or chamber 9,—one of said springs having a bearing at one end 13 of the bore and the other spring bearing against a closure 14 at the other end of the bore. The springs 12, 12 tend normally to hold the obstacle 11 at the intersection of the bore 9 with the threaded portion 6 of the cup 3, but when the plug 7 is screwed into the latter, the thread on the plug will cause the obstacle to move so as to be disposed at one side of the point of intersection of the bore or chamber 9 with the threaded interior of the cup and thus permit the plug to be turned forwardly. The obstacle 11 will then be so disposed that it will bind between the thread of the plug and the opposite wall of the bore or chamber 9 and thus resist backward turning of the plug. With such construction, the plug may be moved forwardly to feed the grease and thus fine forward adjustments of the plug may be made to feed the grease economically. Should it be desired to remove the plug from the cup, this may be accomplished by applying a vigorous turning force to the plug and thus cause the obstacle to be forced past the thread of the plug which it engages and become disposed at the opposite side of that portion of the bore or chamber 9 which intersects the threaded interior of the cup. The plug may then be unscrewed and removed to permit the replenishing of the cup with grease.

Slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, it:

1. The combination with a grease cup, and a feeding plug movable in the same, of a lock contained in the wall of said cup intermediate the ends of said cup and plug and engaging the latter to hold it in adjusted position, said lock being movable substantially tangential to the inner wall of the cup.

2. The combination with a cup having a threaded interior and a threaded plug adapted to pass through the same, of a lock disposed within the cup in position to be engaged by the thread of the plug, and movable substantially tangential to the threaded interior of the cup.

3. The combination of a cup having a threaded interior and having a bore therein and tangential to the bore of said cup and intersecting the threaded interior of the latter, a threaded plug entering said cup, and a movable locking obstacle in the tengential bore and adapted to be engaged by the thread of the plug.

4. The combination of a fixed member having a threaded bore, and also having a chamber tangential to said bore and intersecting the threaded interior thereof, an externally threaded movable member entering the threaded bore of the fixed member, and a spring-pressed obstacle in the tangential chamber in the fixed member and adapted to engage the thread of the movable member to hold the latter against retrograde movement but permit forward movement thereof.

In testimony whereof, I have signed this specification in the presence of two subscribing witnesses.

JOHN ROGERS FLANNERY.

Witnesses:
    HOWARD O. CAPPY,
    F. H. ALLISON.